(12) United States Patent
Jacoby et al.

(10) Patent No.: US 10,484,244 B2
(45) Date of Patent: Nov. 19, 2019

(54) VALIDATION PROCESS FOR A STORAGE ARRAY NETWORK

(71) Applicant: Dell Products, LP, Round Rock, TX (US)

(72) Inventors: Robert B. Jacoby, Merrimack, NH (US); Kenneth Paul Boyd, Tyngsboro, MA (US); Carlos Reyes, Nashua, NH (US)

(73) Assignee: Dell Products, LP, Round Rock, TX (US)

( * ) Notice: Subject to any disclaimer, the term of this patent is extended or adjusted under 35 U.S.C. 154(b) by 174 days.

(21) Appl. No.: 14/600,189

(22) Filed: Jan. 20, 2015

(65) Prior Publication Data

US 2016/0212013 A1 Jul. 21, 2016

(51) Int. Cl.
*H04L 12/24* (2006.01)
*H04L 29/08* (2006.01)

(52) U.S. Cl.
CPC ...... *H04L 41/0873* (2013.01); *H04L 41/0806* (2013.01); *H04L 41/0813* (2013.01); *H04L 41/0866* (2013.01); *H04L 41/0869* (2013.01); *H04L 41/0879* (2013.01); *H04L 41/22* (2013.01); *H04L 67/1097* (2013.01)

(58) Field of Classification Search
CPC ..... H04L 41/0873; H04L 41/12; H04L 43/04; H04L 41/0806; H04L 41/0813; H04L 41/0866; H04L 41/0869; H04L 41/0876; H04L 41/0879; H04L 41/0889; H04L 41/22; H04L 67/1097; H04L 41/0803; H04L 41/0883
See application file for complete search history.

(56) References Cited

U.S. PATENT DOCUMENTS

| 6,754,844 B1 * | 6/2004 | Mitchell | H04L 41/0869 702/186 |
| 7,349,961 B2 * | 3/2008 | Yamamoto | H04L 41/0866 707/999.01 |
| 7,397,770 B2 * | 7/2008 | Le | H04L 41/0866 370/254 |
| 7,496,551 B1 * | 2/2009 | Jalagam | G06N 5/04 706/47 |

(Continued)

OTHER PUBLICATIONS

Agrawal et al., "Policy-Based Validation of San Configuration", 5th IEEE International Workshop on Policies for Distributed Systems and Networks, Jun. 2004, pp. 77-86.*

*Primary Examiner* — Vivek Srivastava
*Assistant Examiner* — William C McBeth
(74) *Attorney, Agent, or Firm* — Hamilton, Brook, Smith & Reynolds, P.C.

(57) ABSTRACT

A method of validating a storage array network deployment includes receiving information from a user, utilizing the information in a capacity associated with the storage array network, and notifying the user if the utilizing produces an error. The method may further include waiting for user direction before utilizing the information, or waiting until a predetermined amount of information has been received before utilizing the information. The method may further include evaluating one or more formats of the information for suitability for an intended use of the information. The error may be indicated by an abnormal response as a result of utilizing the information.

10 Claims, 5 Drawing Sheets

(56) References Cited

U.S. PATENT DOCUMENTS

| | | | |
|---|---|---|---|
| 7,814,192 B2* | 10/2010 | Kumar | H04L 41/0873 370/238 |
| 7,817,583 B2* | 10/2010 | Graves | H04L 41/12 370/257 |
| 7,881,967 B1* | 2/2011 | Srinivasan | H04L 41/0869 370/254 |
| 7,886,031 B1* | 2/2011 | Taylor | H04L 41/0873 709/220 |
| 8,024,440 B2* | 9/2011 | Jibbe | H04L 41/0803 709/223 |
| 8,046,477 B1* | 10/2011 | Arutla | G06F 3/06 709/220 |
| 8,301,739 B1* | 10/2012 | Krishnan | H04L 67/1097 709/217 |
| 8,341,251 B2* | 12/2012 | Gao | H04L 67/1097 709/220 |
| 8,572,679 B1* | 10/2013 | Wang | H04L 41/0813 370/328 |
| 8,880,690 B1* | 11/2014 | Kennedy | H04L 41/0813 709/223 |
| 9,170,737 B1* | 10/2015 | Gugliemino | H04L 41/0803 |
| 2003/0055932 A1* | 3/2003 | Brisse | H04L 67/1097 709/223 |
| 2003/0140128 A1* | 7/2003 | Cox | H04L 41/0873 709/221 |
| 2003/0187985 A1* | 10/2003 | Rohling | H04L 41/0226 709/225 |
| 2004/0165544 A1* | 8/2004 | Cornett | H04L 41/0869 370/254 |
| 2005/0086494 A1* | 4/2005 | Carley | G06F 21/71 713/182 |
| 2005/0125438 A1* | 6/2005 | Krishnaswamy | G06F 9/44589 |
| 2005/0198631 A1* | 9/2005 | Bisher | H04L 41/0869 717/178 |
| 2006/0080318 A1* | 4/2006 | Huston | H04L 41/0886 |
| 2006/0168070 A1* | 7/2006 | Thompson | G06F 9/542 709/206 |
| 2008/0172480 A1* | 7/2008 | Agrawal | H04L 67/1097 709/221 |
| 2008/0205300 A1* | 8/2008 | Le | H04L 41/0866 370/254 |
| 2009/0013162 A1* | 1/2009 | Nandan | G06F 8/61 713/1 |
| 2009/0100000 A1* | 4/2009 | Chen | H04L 41/0893 |
| 2009/0240713 A1* | 9/2009 | Jia | H04L 41/0866 |
| 2010/0287266 A1* | 11/2010 | Asati | H04L 12/4641 709/222 |
| 2011/0016202 A1* | 1/2011 | Ye | H04L 41/044 709/222 |
| 2012/0030526 A1* | 2/2012 | Matsuda | H04L 41/0869 714/57 |
| 2012/0185925 A1* | 7/2012 | Barkie | H04L 41/0866 726/7 |
| 2013/0151975 A1* | 6/2013 | Shadi | H04L 41/22 715/734 |
| 2014/0064149 A1* | 3/2014 | Frey | H04L 41/0869 370/255 |
| 2015/0188775 A1* | 7/2015 | Van Der Walt | H04L 41/0803 715/734 |
| 2015/0222592 A1* | 8/2015 | Andrews | H04L 61/2015 709/221 |
| 2015/0271130 A1* | 9/2015 | McCallum | H04L 61/2015 709/223 |
| 2015/0277804 A1* | 10/2015 | Arnold | H04L 67/1097 710/74 |
| 2016/0087842 A1* | 3/2016 | Tang | H04L 41/0866 455/67.11 |
| 2016/0337187 A1* | 11/2016 | Gopalarathnam | H04L 41/0816 |

\* cited by examiner

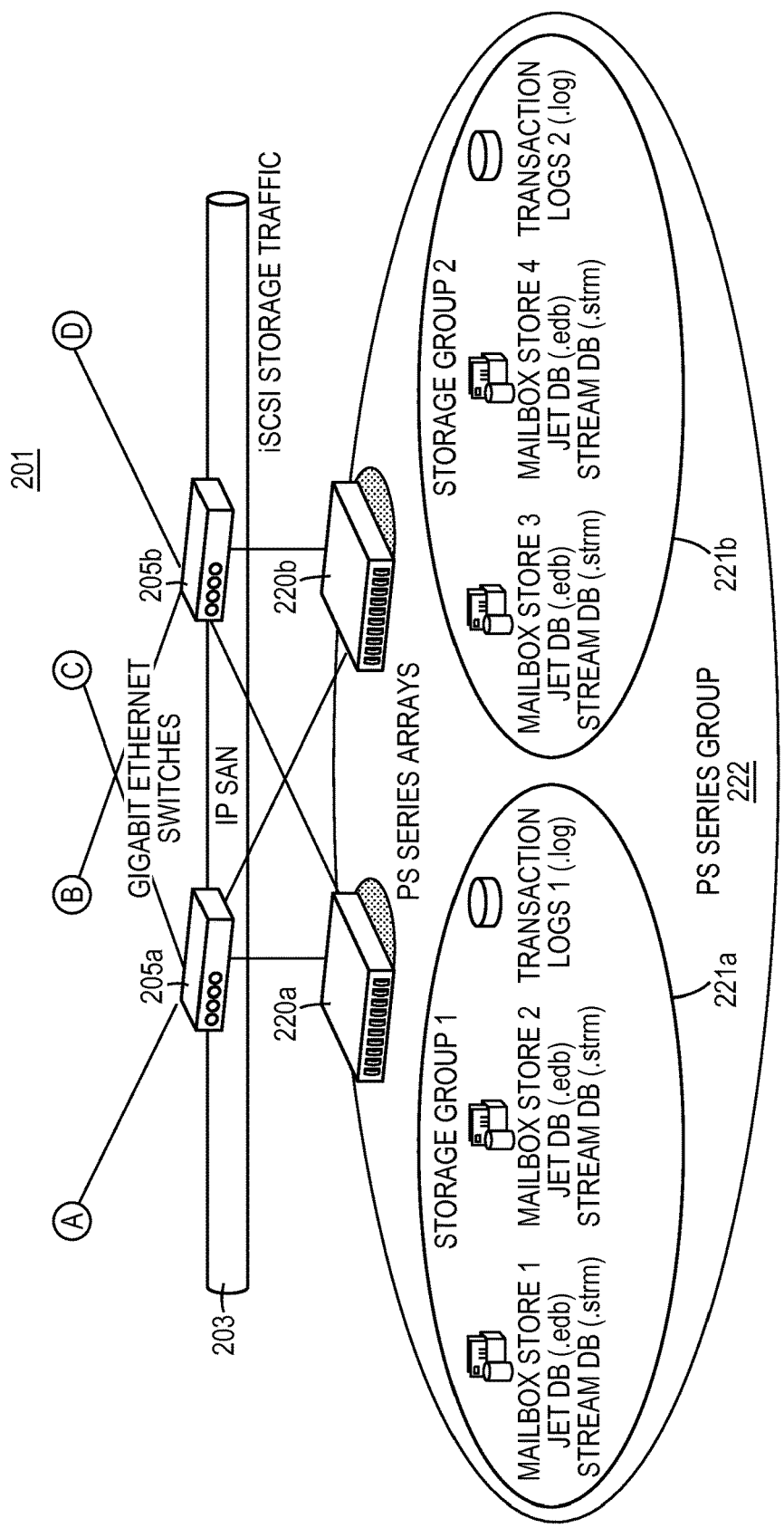
FIG. 2B-II

VALIDATION PROCESS FOR A STORAGE ARRAY NETWORK

BACKGROUND OF THE INVENTION

As the value and use of information continues to increase, individuals and businesses seek additional ways to process and store information. One option available to users is information handling systems.

An information handling system generally processes, compiles, stores, and/or communicates information or data for business, personal, or other purposes thereby allowing users to take advantage of the value of the information.

Because technology and information handling needs and requirements vary between different users or applications, information handling systems may also vary regarding what information is handled, how the information is handled, how much information is processed, stored, or communicated, and how quickly and efficiently the information may be processed, stored, or communicated.

The variations in information handling systems allow for information handling systems to be general or configured for a specific user or specific use, such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The data storage systems may be configured as a Storage Area Network (SAN). SAN environments are generally quite complex, so network professionals must have extensive knowledge of networking principals to properly deploy a SAN. Even experienced technicians and/or engineers may introduce errors into a deployment. For example, an incorrect value for a field may be entered through a typing error or transcription error, which can lead to poor SAN performance. Such a seemingly minor issue may require many hours of troubleshooting to resolve. Examples of such fields include server addresses, SYSLOG server identification, wrong SNMP server identification, among others.

Many other potential configuration errors exist. For example, components may have been physically connected incorrectly, or required connections may be missing.

Further, configurations may change over time. Such changes introduce an opportunity for a set-up error.

There is currently no easy way to confirm that a SAN is properly configured, following an initial setup or after a configuration change.

SUMMARY OF THE INVENTION

The described embodiments provide a validation procedure that may be executed during or after an initial SAN setup, or when a reconfiguration of the SAN occurs. The described embodiments may notify a maintainer of the SAN if conflict or errors are detected.

The described embodiments may evaluate a configuration state of devices that make up the SAN, along with devices otherwise associated with the SAN, such as the customer's email server, syslog server, SNMP server, among others.

As additional storage arrays are added to the group, the described embodiments may compare new information against the current (i.e., running) configuration, and the customer will be notified if they've misconfigured any of their IP addresses, subnet masks, or gateways.

In one aspect, the invention is a method of validating a network deployment, including utilizing deployment information received from the user upon receiving direction from the user to validate the network deployment. The method further includes notifying the user if the utilizing deployment information produces an abnormal response.

In one embodiment, utilizing deployment information received from the user includes applying a server IP address. In another embodiment, utilizing deployment information received from the user may include one or more of applying a subnet mask, applying a default gateway, applying a domain name server address, and applying a network time protocol.

In one embodiment, an abnormal response includes a mismatched subnet. In another embodiment, an abnormal response includes an incorrect gateway.

In one embodiment, the method further includes comparing one or more set-up parameters for an existing network to corresponding set-up parameters of a newly-added network, and notifying the user if a mismatch is determined to exist. In another embodiment, the notifying further includes disclosing one or more aspects of the abnormal results.

In another aspect, the invention is a method of validating a storage array network deployment, including receiving information from a user, utilizing the information in a capacity associated with the storage array network, and notifying the user if the utilizing produces an error.

One embodiment further includes waiting for user direction before utilizing the information. Another embodiment further includes waiting until a predetermined amount of information has been received before utilizing the information. Another embodiment further includes evaluating one or more formats of the information for suitability for an intended use of the information.

In one embodiment, the error includes detecting an abnormal response as a result of utilizing the information. In one embodiment, notifying further includes disclosing one or more aspects of the error.

In another aspect, the invention is a non-transitory computer-readable medium with computer code instruction stored thereon, the computer code instructions when executed by an a processor cause an apparatus to receive information from a user, utilize the information in a capacity associated with the storage array network, and notify the user if the utilizing produces an error.

In one embodiment, the computer code instructions, when executed by a processor, further cause the apparatus to wait for user direction before utilizing the information. In another embodiment, the computer code instructions when executed by an a processor further cause the apparatus to wait until a predetermined amount of information has been received before utilizing the information. In another embodiment, the computer code instructions when executed by an a processor further cause the apparatus to evaluate one or more formats of the information for suitability for an intended use of the information.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
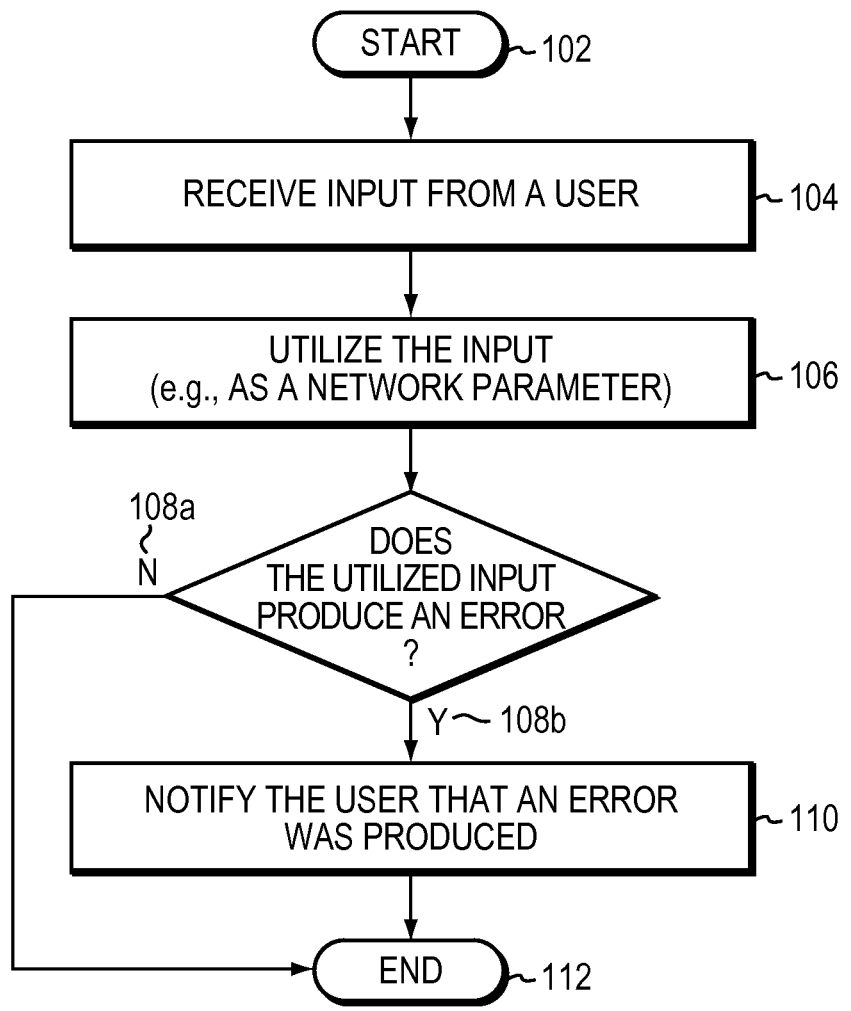
FIG. 1 illustrates an embodiment of a procedure for validating a storage array network (SAN) according to the invention.

One embodiment of a procedure for validating a storage array network (SAN) is depicted in FIG. 1. At the start 102 of the procedure, input (i.e., information) from a user is received 104. The input may include a value or values, a text string, a check box or radio button selection, or any other type of information-conveying entity known in the art. In one embodiment, the input is received in response to some stimulus, e.g., a request for such information. In other embodiments, the input is received spontaneously from an information source, not in response to any request or other stimulus.

In one embodiment, receiving 104 input from a user may be part of an initial SAN setup procedure, i.e., when a SAN with an initial storage array is first assembled and connected to a host. In another embodiment, the receiving 104 input from a user may be part of an augmented SAN deployment, where one or more additional storage arrays are added to an existing SAN.

The received input is utilized 106 in the SAN as, for example, a network parameter. The result of the utilization may result in an error. If no error results 108a, the procedure for validating the SAN ends 112. If the utilized input produces an error 108b, the user is notified that an error was produced and the procedure for validating the SAN ends 112. Utilizing input information, when the input is received, may identify physical misconnections, typographical or transcription errors and other such user input errors, at the time of SAN deployment or augmentation.

The determination of whether or not utilizing an input produces an error may depend on any one of, or a combination of, a number of different criteria. Part of the determination may include simply evaluating whether the input format is appropriate for the intended utilization. For example, a hexadecimal value would not be appropriate for use as an IP address. Similarly, a pure number value would be inappropriate for use in a field that calls for a text string.

Part of the determination may include actively utilizing the input, and evaluating whether the expected response to the utilization occurs (i.e., that the input actually works for its intended purpose). Examples of input that may be utilized to determine if the input works for its intended purpose include (1) IP address, (2) Subnet mask, (3) Default gateway, (4) Domain Name Server (DNS), (5) Network Time Protocol (NTP), (6) server addresses, (7) SYSLOG server, among others known to be associated with a SAN deployment.

In one embodiment, the determination (108a, 108b) of whether utilization of an input causes an error to occur is made each and every time the input (or an updated input) is received. In some embodiments, the determination (108a, 108b) is made as the input is received. In other embodiments, the determination (108a, 108b) is made for two or more inputs as a batch. The batch determination may be made upon user initiation, upon a predetermined threshold number of inputs being received, or upon other suitable criteria.

The determination (108a, 108b) may evaluate appropriate configuration of associated devices such as (1) email server, (2) SYSLOG server, (3) SNMP server, among others, so that potential problems may be identified as part of the deployment.

For an augmented SAN deployment, where one or more additional storage arrays are added to an existing SAN, input from a user may relate to information unique to the additional storage arrays. The input in this case may need to be compatible with the currently running SAN configuration (i.e., the SAN configuration that the additional storage arrays will be augment), so that the input may be compared to corresponding parameters from the existing SAN configuration.

Figure 2A:
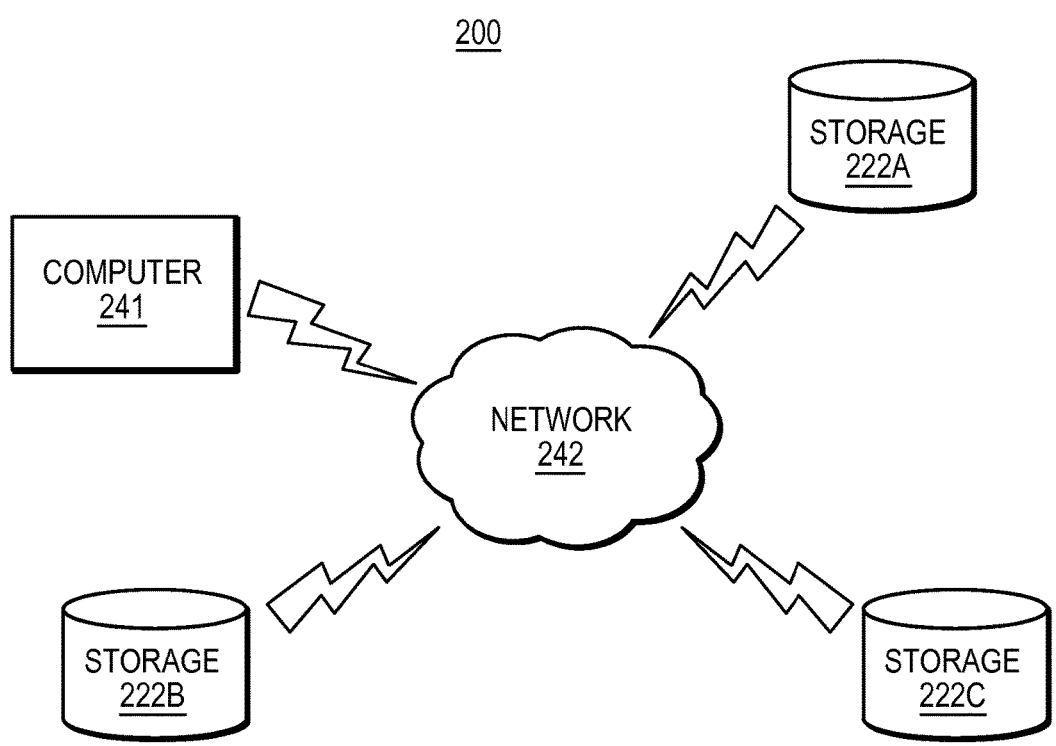
FIG. 2A is a schematic view of a computer network environment in which an embodiment of the present invention may be implemented.

FIG. 2A illustrates a computer network environment 200 in which an embodiment of the present invention may be implemented. The computer 241 and the sets 222A, 222B, 222C of one or more storage devices (each one of the sets 222A, 222B, 222C representing one or more storage devices) are linked through network 242. The computer 241 and the sets 222A, 222B, 222C of one or more storage devices may be connected through any network as is known in the art, including a storage area network (SAN), a wide area network (WAN) or local area network (LAN). The computer 241 may embody an Information Handling System (IHS) 320 (referring to FIG. 3 to follow) and/or any embodiment of the IHS described herein. While three sets 222A, 222B, 222C of storage devices are depicted, the computer network environment 200 may comprise any number of storage devices.

Figure 2B:
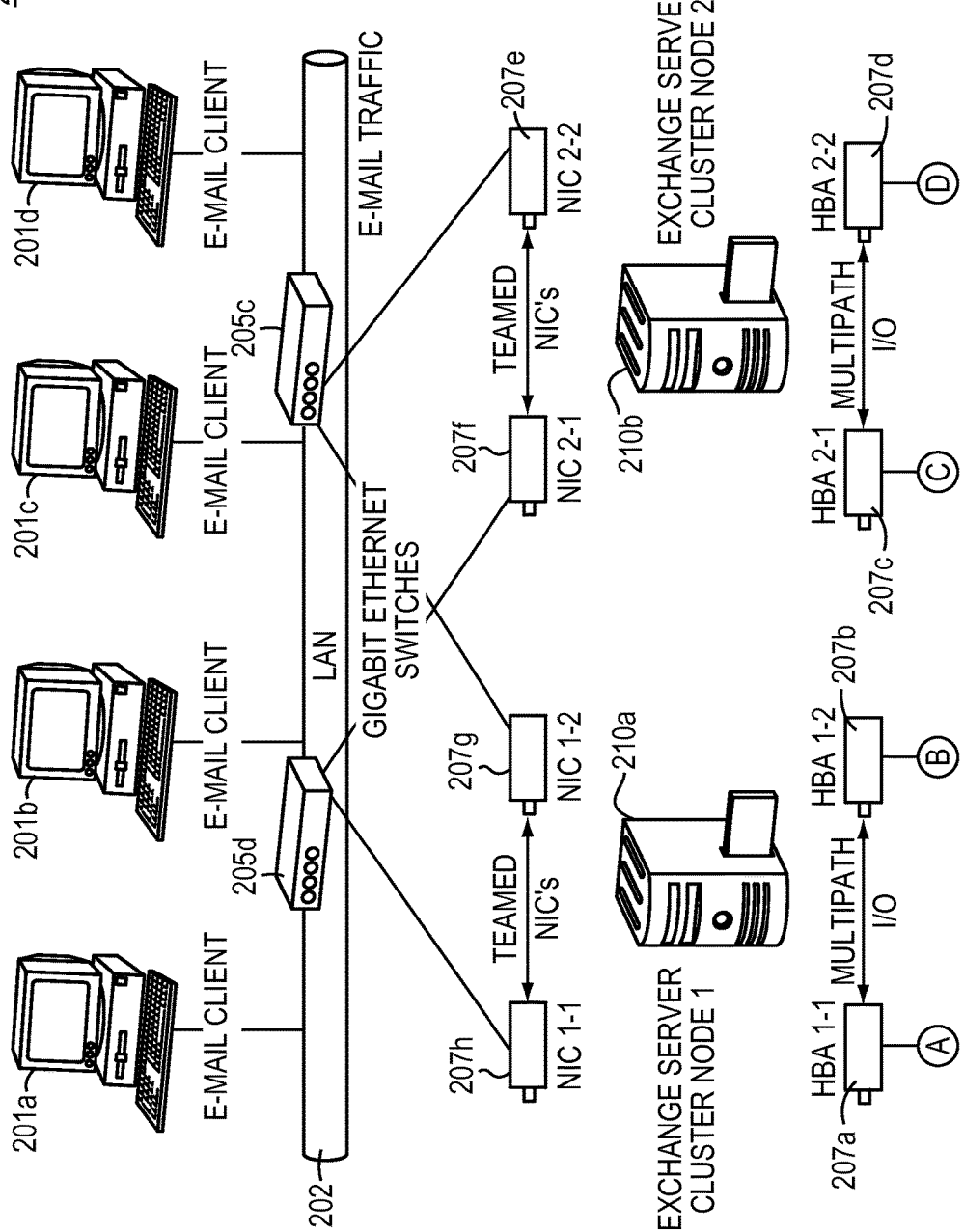
FIG. 2B (FIGS. 2B-I and 2B-II) is a block diagram view of another computer network environment in which an embodiment of the present invention may be implemented.

As illustrated in FIG. 2B (FIGS. 2B-I and 2B-II), in one embodiment, the present invention may run on a network 201 that may include, but is not limited to, a storage area network (SAN) 203 and a local area network (LAN) 202. The LAN 202 may include components such as one or more clients 201a, 201b, 201c, 201d that communicate through one or more network switches 205c, 205d to one or more network interface cards (NICs) 207e, 207f, 207g, 207h to one or more servers 210a, 210b. The SAN 203 may include, but is not limited to, an internet protocol (IP) SAN. The SAN 203 may include components such as one or more servers 210a, 210b that communicate to one or more network switches 205a, 205b through a set of one or more network interface cards (NICs) 207a, 207b, 207c, 207d. Network switches 205a, 205b of the storage area network 203 may communicate to Peer Storage (PS) series arrays 220a, 220b across the SAN 203. Therefore, the SAN 203 may include components such as a PS series group 222 that may include, but is not limited, to, storage groups 221a, 221b and PS series data arrays 220a, 220b. The PS series group 222 may include a given set (referring to each of 222A, 222B, and 222C of FIG. 2A) of storage devices. In an alternative embodiment, the SAN 203 may be considered to include the LAN 202 and the above-mentioned components with which the LAN 202 communicates, in addition to the above-mentioned components with which the SAN 203 communicates.

Figure 3:
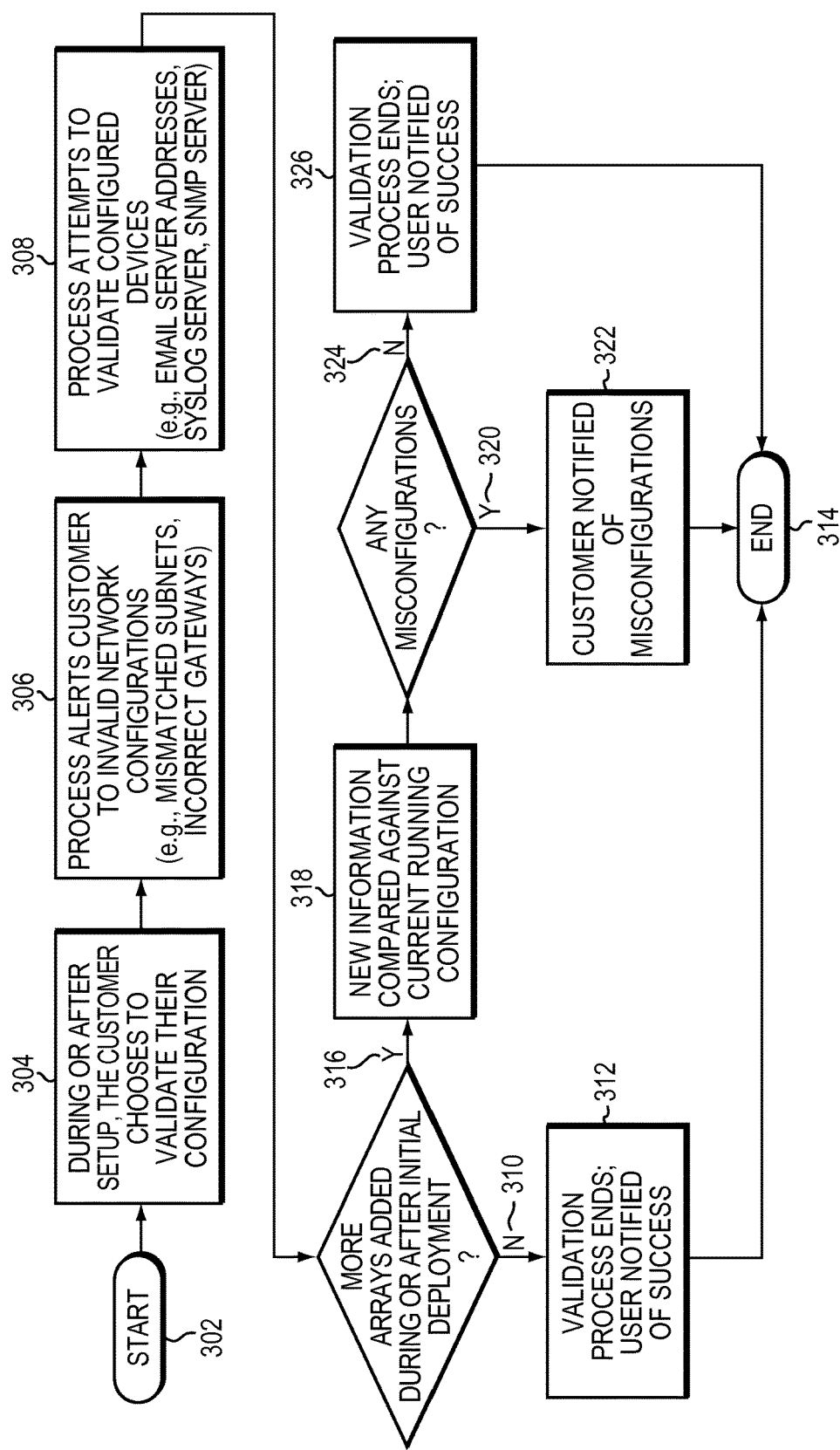
FIG. 3 illustrates one example of a SAN validation process constructed and arranged according to the invention.

FIG. 3 illustrates one example of a SAN validation process according to the embodiments described herein. After or during the SAN set up process, a user (e.g., SAN customer) chooses 304 to validate the set up. During or after completion of the validation process, the user may receive an alert 306 identifying any invalid network configurations. The user may further receive validation results 308 regarding configured devices. If no further arrays are being added 310, the user is notified that the configuration is valid 312 and the validation process ends 314.

If one or more arrays are being added 316, any new information relating to the added arrays are compared 318 against the existing configuration for validity. If a configuration mismatch exists 320, the user is notified of the mismatch 322 and the process ends 314. The user may also receive information concerning the nature of the mismatch to aid in correcting the problem. If no configuration mismatch exists, the user is notified that the configuration is valid 326 and the validation process ends 314.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

It will be apparent that one or more embodiments described herein may be implemented in many different forms of software and hardware. Software code and/or specialized hardware used to implement embodiments described herein is not limiting of the embodiments of the invention described herein. Thus, the operation and behavior of embodiments are described without reference to specific software code and/or specialized hardware—it being understood that one would be able to design software and/or hardware to implement the embodiments based on the description herein.

Further, certain embodiments of the example embodiments described herein may be implemented as logic that performs one or more functions. This logic may be hardware-based, software-based, or a combination of hardware-based and software-based. Some or all of the logic may be stored on one or more tangible, non-transitory, computer-readable storage media and may include computer-executable instructions that may be executed by a controller or processor. The computer-executable instructions may include instructions that implement one or more embodiments of the invention. The tangible, non-transitory, computer-readable storage media may be volatile or non-volatile and may include, for example, flash memories, dynamic memories, removable disks, and non-removable disks.

While this invention has been particularly shown and described with references to example embodiments thereof, it will be understood by those skilled in the art that various changes in form and details may be made therein without departing from the scope of the invention encompassed by the appended claims.

What is claimed is:

1. A method of validating a network deployment, comprising:
by a computer-based information handling system comprising:
a processor; and
a memory with computer code instructions stored thereon, the memory operatively coupled to the processor such that, when executed by the processor, the computer code instructions cause the information handling system to implement:
receiving, from a user, deployment information comprising parameters for a Storage Area Network (SAN) deployment, the deployment information comprising at least (i) default gateway, (ii) domain name server, (iii) network time protocol and (iv) SYSLOG server elements;
in response to having received direction from the user to validate the SAN deployment, utilizing each element of the deployment information received from the user when the element of the deployment information is received, wherein the utilizing does not occur as a batch;
determining, as each element of the deployment information is utilized, a response to the utilization of the element of the deployment information;
notifying the user of an abnormal response to the utilization of the element of the deployment information, the notifying comprising an alert identifying an invalid network configuration;
comparing the received deployment information for the SAN deployment to corresponding deployment information of a currently running SAN;
determining a configuration mismatch exists; and
in response to determining the configuration mismatch exists, notifying the user of the configuration mismatch and providing the user with information that characterizes the configuration mismatch.

2. The method of claim 1, wherein utilizing deployment information received from the user includes applying a server IP address when the server IP address is received.

3. The method of claim 1, wherein utilizing deployment information received from the user includes applying a subnet mask when the subnet mask is received.

4. The method of claim 1, wherein utilizing deployment information received from the user includes applying a default gateway when the default gateway is received.

5. The method of claim 1, wherein utilizing deployment information received from the user includes applying a domain name server address when the domain name server address is received.

6. The method of claim 1, wherein utilizing deployment information received from the user includes applying a network time protocol when the network time protocol is received.

7. The method of claim 1, wherein the invalid configuration is a mismatched subnet.

8. The method of claim 1, wherein the invalid configuration is an incorrect gateway.

9. The method of claim 1, wherein the notifying further includes disclosing one or more aspects of the abnormal response.

10. A non-transitory computer-readable medium with computer code instruction stored thereon, the computer code instructions, when executed by a processor, cause an apparatus to:
 receive, from a user, deployment information comprising parameters for a Storage Area Network (SAN) deployment, the deployment information comprising at least (i) default gateway, (ii) domain name server, (iii) network time protocol and (iv) SYSLOG server elements;
 in response to having received direction from the user to validate the SAN deployment, utilize each element of the deployment information received from the user when the element of the deployment information is received, wherein the utilizing does not occur as a batch;
 determine, as each element of the deployment information is utilized, a response to the utilization of the element of the deployment information;
 notify the user of an abnormal response to the utilization of the element of the deployment information, the notifying comprising an alert identifying an invalid network configuration; compare the received deployment information for the SAN deployment to corresponding deployment information of a currently running SAN;
 determine a configuration mismatch exists; and
 in response to determining the configuration mismatch exists, notify the user of the configuration mismatch and provide the user with information that characterizes the configuration mismatch.

* * * * *